United States Patent
Frank et al.

(10) Patent No.: US 10,489,612 B2
(45) Date of Patent: Nov. 26, 2019

(54) MEMORY CONTROLLER TO VERIFY AUTHENTICITY OF DATA

(71) Applicants: Juergen Frank, Munich (DE); Michael Staudenmaier, Munich (DE); Manfred Thanner, Neubiberg (DE)

(72) Inventors: Juergen Frank, Munich (DE); Michael Staudenmaier, Munich (DE); Manfred Thanner, Neubiberg (DE)

(73) Assignee: NXP USA, Inc., Austin, TX (US)

( * ) Notice: Subject to any disclaimer, the term of this patent is extended or adjusted under 35 U.S.C. 154(b) by 448 days.

(21) Appl. No.: 14/784,038

(22) PCT Filed: Apr. 29, 2013

(86) PCT No.: PCT/IB2013/053385
§ 371 (c)(1),
(2) Date: Oct. 13, 2015

(87) PCT Pub. No.: WO2014/177904
PCT Pub. Date: Nov. 6, 2014

(65) Prior Publication Data
US 2016/0070934 A1    Mar. 10, 2016

(51) Int. Cl.
*G06F 21/79* (2013.01)
*G06F 21/57* (2013.01)
(Continued)

(52) U.S. Cl.
CPC .......... *G06F 21/79* (2013.01); *G06F 12/0246* (2013.01); *G06F 12/1458* (2013.01);
(Continued)

(58) Field of Classification Search
CPC ........ G06F 21/79; G06F 21/572; G06F 21/64; G06F 21/6218; G06F 21/44; G06F 12/1458; G06F 12/0246; G06F 2212/1052
(Continued)

(56) References Cited

U.S. PATENT DOCUMENTS 8,250,648 B2    8/2012  Kabzinski et al.
9,054,880 B2 *  6/2015  Yamamoto ............ H04L 9/0844
(Continued)

FOREIGN PATENT DOCUMENTS

JP    2009025907    2/2009

OTHER PUBLICATIONS

International Search Report and Written Opinion correlating to PCT/IB2013/053385 dated Jan. 24, 2014.

*Primary Examiner* — Mardochee Chery (57) ABSTRACT

A memory controller is used to verify authenticity of data stored in a first memory unit, and includes a secure memory unit which stores a pre-stored value representative of the authenticity of the data to be written in the first memory unit. A processing system calculates a value representative of the data in the first memory unit after a write cycle. The calculation of the calculated value is triggered by the write cycle. The calculated value is compared with the pre-stored value to verify whether the data stored in the first memory unit after the write cycle has been altered in accordance with the authenticity. By comparing the calculated value with the pre-stored value, authenticity of the data stored in the first memory unit after the write cycle is verified, thus preventing the memory controller from operating if the data written to the first memory unit is not authentic.

15 Claims, 3 Drawing Sheets

(51) Int. Cl.
*G06F 12/02* (2006.01)
*G06F 12/14* (2006.01)
*G06F 21/44* (2013.01)
*G06F 21/62* (2013.01)
*G06F 21/64* (2013.01)

(52) U.S. Cl.
CPC ............ *G06F 21/44* (2013.01); *G06F 21/572* (2013.01); *G06F 21/6218* (2013.01); *G06F 21/64* (2013.01); *G06F 2212/1052* (2013.01)

(58) Field of Classification Search
USPC ........................................................ 711/103
See application file for complete search history.

(56) References Cited

U.S. PATENT DOCUMENTS

| | | | |
|---|---|---|---|
| 9,311,470 B2 * | 4/2016 | Blume | G06F 21/33 |
| 2005/0060154 A1 | 3/2005 | Wyssen | |
| 2007/0096870 A1 * | 5/2007 | Fisher | E05B 19/0005 |
| | | | 340/5.53 |
| 2008/0028220 A1 | 1/2008 | Wyssen | |
| 2008/0215847 A1 | 9/2008 | Holtzman et al. | |
| 2009/0013196 A1 * | 1/2009 | Ito | H04L 9/3236 |
| | | | 713/193 |
| 2009/0260050 A1 * | 10/2009 | George | G06F 21/53 |
| | | | 726/1 |
| 2010/0222135 A1 | 9/2010 | Sylla et al. | |
| 2011/0040960 A1 | 2/2011 | Deierling et al. | |
| 2013/0019323 A1 * | 1/2013 | Arvidsson | H04W 12/06 |
| | | | 726/30 |
| 2014/0040605 A1 * | 2/2014 | Futral | G06F 9/445 |
| | | | 713/2 |

* cited by examiner

MEMORY CONTROLLER TO VERIFY AUTHENTICITY OF DATA

FIELD OF THE INVENTION

This invention relates to a memory controller, to a method for verifying authenticity of data stored in a memory unit and to a method for controlling a memory unit.

BACKGROUND OF THE INVENTION

An electronic system may include, among other electronic units, a memory unit where data is stored and a processing unit for example for executing operations with the data or for running computer programs stored in the memory unit.

For a secure functioning of the electronic system and to protect the data from unauthorized access or manipulation, the data of the memory unit requires to be verified. Verification for the correct and safe functioning of the electronic system is usually performed by the processing unit in a start-up phase of the electronic system.

United States patent application US2008/0215847 discloses a device comprising an unsecure memory unit and a secure controller. The unsecure memory unit may be a non-volatile mass storage flash memory where authorization is not required in order to gain read/write access to data stored therein. The secure controller may be a processor to control operations of retrieval and storage of the data in the unsecure memory unit. In order to provide security against unauthorized copies of the data that may be stored in the unsecure memory unit, the device is provided with a secure firmware stored in the unsecure memory unit. The secure firmware needs to be authenticated to provide security to the device. This is done by signing the secure firmware typically at a time of loading it. Signing the secure firmware involves a calculation of one or more HASH values calculated for one or more portions of the secure firmware and a comparison of the calculated HASH values with pre-stored HASH values in the device. A mismatch between the calculated HASH values and the pre-stored HASH values indicates that the secure firmware is not authentic anymore. After the secure firmware has been signed, the secure firmware is executed to control the device comprising the unsecure memory unit.

A problem of the device disclosed in US2008/0215847 is that the secure firmware needs to be signed and executed in two successive steps in order to provide the security to the device.

A further problem of the device disclosed in US2008/0215847 is that before the secure firmware may be efficiently executed, the secure firmware needs to be copied from the unsecure memory unit to another memory, typically a volatile RAM (Random Access Memory). In fact the unsecure memory unit is typically slower than the volatile RAM and not inherently executable because it does not have random access capability as long as it is used as a mass storage flash memory.

A further disadvantage associated with the above-mentioned problem is that the secure firmware has typically a size larger than a size of the volatile RAM. For this reason the secure firmware needs to be split in portions and each one of the portions needs to be copied to the volatile RAM and to be executed by the volatile RAM. Consequently a maximum size of each one of the portions of the secure firmware is determined by the size of the volatile RAM capable of executing each one of the portions of the secure firmware.

SUMMARY OF THE INVENTION

The present invention provides a memory controller, a method for verifying authenticity of data stored in a memory unit, a method for controlling a memory unit and a computer program product as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings.

FIG. 2b schematically shows an example of a microcontroller using the memory controller of FIG. 2a.

Elements in the figures are illustrated for simplicity and clarity and have not necessarily been drawn to scale. In the Figures, elements which correspond to elements already described may have the same reference numerals.

DETAILED DESCRIPTION OF THE PREFERRED EMBODIMENTS

Figure 1A:
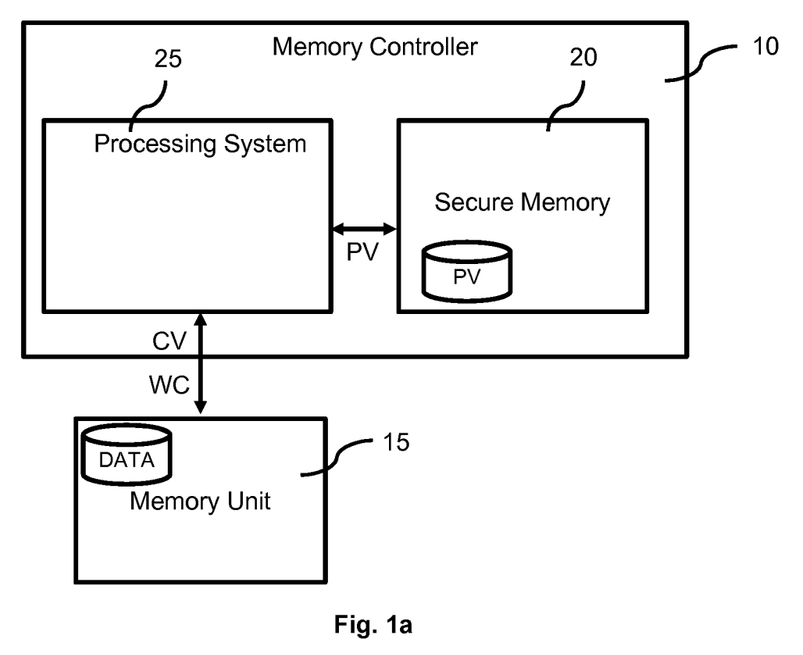
FIG. 1a schematically shows an example of an embodiment of a memory controller.

FIG. 1a schematically shows an example of an embodiment of a memory controller 10 which is suitable to verify authenticity of data DATA stored in a first memory unit 15. The memory controller 10 comprises a secure memory unit 20 which stores a pre-stored value PV representative for the authenticity of the data DATA to be written in the first memory unit 15 and a processing system 25 which calculates a calculated value CV representative for data DATA in the first memory unit 15 after a write cycle WC applied to this first memory unit 15. The calculation of the calculated value CV is triggered by the write cycle WC. The processing system 25 further compares the calculated value CV with the pre-stored value PV to verify whether the data DATA in the first memory unit 15 after the write cycle WC has been altered in accordance with the desired authenticity. The first memory unit 15 may be part of the memory controller 10 or alternatively as shown in FIG. 1a may be external to the memory controller 10. The first memory unit 15 may be a non-volatile memory, i.e. a type of memory typically used for mass storage in electronic devices such as for example computer systems, memory cards etc. A broadly used type of non-volatile memory is a flash memory or flash array memory. A flash memory may be electrically erased and reprogrammed like an EEPROM (Electrically Erasable Programmable Memory). Data in the flash memory may be of content type (text, music, video etc.) or also of software type (computer programs, language code, etc.). The flash memory is typically an economical, standardized but unsecure type of memory. Data stored in the flash memory maybe unintentionally or intentionally altered without authorization. The secure memory unit 20 is instead a type of secure memory whose data may not be modified and/or where authorization is required to gain access to the data stored in it. For example the secure memory unit 20 may be arranged in a secure area of the memory controller 10. This secure area of the memory controller 10 may be a memory area having special access rights in a way that only authenticated people may access it. The pre-stored value PV stored in the secure memory unit 20 representative for the authenticity of the data DATA in the first memory unit 15 may be for example a HASH value. A HASH value is a value returned by a HASH function that maps large data sets of variable length to smaller data sets of a fixed length. Therefore the pre-stored value may be a compact representation of the data DATA stored in the first memory unit 15 or of a portion of the data DATA stored in the first memory unit 15. The pre-stored value PV may be also encrypted for better security. There are several HASH algorithms known in the art. Examples of HASH algorithms are SHA-1/2/3 and MD5. The processing system 25 is a system suitable to process the data DATA stored in the first memory unit 15, to perform operations on the data and to retrieve the pre-stored and calculated values PV and CV. As it will be further clarified in describing other embodiments according to the invention, the processing system 25 may include one or more processors, each one dedicated to execute one or more of the operations mentioned.

The memory controller 10 of FIG. 1a may be part of a larger system controlling a network of devices interacting with each other and wherein the memory controller 10 gives instructions for operations and timing of operations to be performed by each of the devices in the network. In a context of automotive applications the memory controller 10 may be for example part of a MCU (Microcontroller Unit) and the devices in the network may be CAN (Control Area Network) or LIN (Local Interconnect Network) transceivers or other MCUs. These transceivers are controlling electrical features in a vehicle such as indoor or outdoor lights, electrical windows, etc. In this case the instructions for the operations of these devices may be related for example to switching on/off indoor or outdoor lights, lifting-up/sliding down electrical windows, etc. The data DATA in the first memory unit 15 may consist of said instructions for the operations of the devices in the network. A pre-stored value PV (encrypted or not, as described above) representative for the authenticity of this data DATA may be pre-stored in the secure memory unit 20. When one of the instructions needs to be performed, a write instruction may have to be given to the first memory unit 15. The write instruction initiates the write cycle WC. The write cycle WC may include a prologue and an epilogue in which for example a writing mode of the first memory unit 15 is respectively enabled and disabled. Somewhere in between the prologue and the epilogue of the write cycle WC, the first memory unit 15 is written. The write cycle WC may for example enable or disable a charge pump circuitry in one of the devices (for example the MCU) in the network. The write cycle WC triggers the calculation of the calculated value CV by the processing system 25. The calculated value CV is representative of the data DATA altered in the first memory unit 15 after the write cycle WC. By way of the same example used for the pre-stored value PV, the calculated value CV may also be a calculated HASH value. The calculated value CV may be stored in a secure area of the memory controller 10 which is not modifiable by anyone. After calculation of the calculated value CV, the processing system 25 compares the calculated value CV with the pre-stored value PV. If the calculated value CV and the pre-stored value PV are equal then the memory controller 10 continues to operate normally in accordance with the authenticity of the data DATA represented by the pre-stored value PV (e.g. pre-stored HASH value) in the secure memory unit 20. If the calculated value CV does not match the pre-stored value PV stored in the secure memory unit 20, then the memory controller 10 and/or the first memory unit 15 may be limited in their functionality. In this last case for example the memory controller 10 and/or the first memory unit 15 may stop functioning. Alternatively the memory controller 10 and the first memory unit 15 may stop communicating with each other.

In another exemplary embodiment, a comparison of the calculated value CV with the pre-stored value PV is executed during a start-up of the memory controller 10 and the first memory unit 15. In this exemplary embodiment the processing system 25 retrieves the pre-stored value PV from the secure memory unit 20 during the start-up. Further to that, during the start-up, the processing system 25 retrieves the calculated value CV from the secure area of the memory controller 10 in which the calculated value CV is stored. Since calculation of the calculated value CV is executed at a different moment (after the write cycle WC) then when the calculated value CV is compared with the pre-stored value PV, i.e. during the start-up of the memory controller 10 and the first memory unit 15, the start-up is executed in a much shorter time. This has advantages in systems in which a fast start-up time is required. For example a typical verification time for standard memory controllers which have a non-volatile flash memory of a 8 Mbyte size is in the order of 200-300 ms. When the standard memory controller having the 8 Mbyte non-volatile flash memory is used for example in the mentioned CAN network, the standard memory controller needs to be already active in circa 100 ms. This means that in this case the standard memory controller may not send secure instructions before 200-300 ms, i.e. the time required to start-up the standard memory controller. The start-up time of the standard memory controller increases with the size of the non-volatile flash memory. It is therefore expected that the described memory controller 10 may be particularly advantageous and may be used in place of the standard memory controllers having a large non-volatile flash memory requiring long start-up times.

Figure 1B:
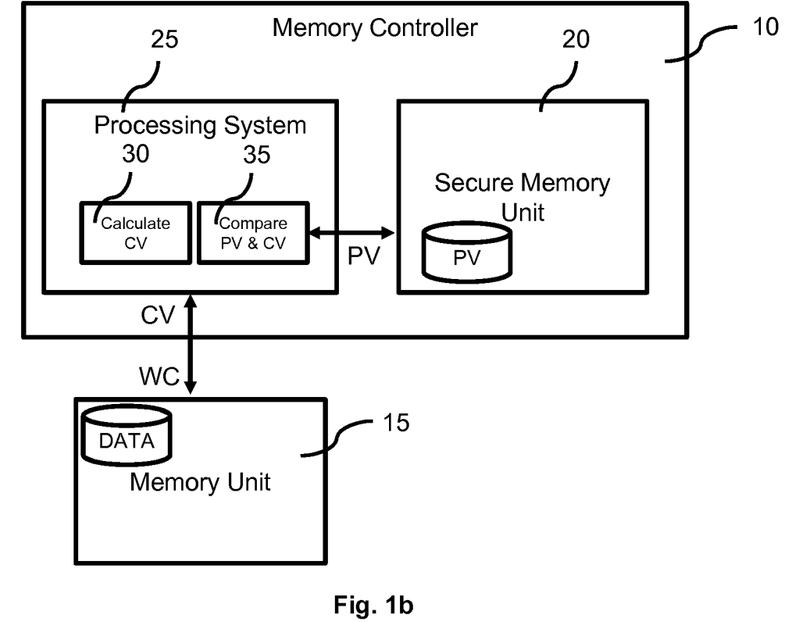
FIG. 1b schematically shows a further example of an embodiment of a memory controller.

In another exemplary embodiment shown in FIG. 1b, the processing system 25 further includes two processing units: a first processing unit 30 is used to calculate the calculated value CV and a second processing unit 35 is used to compare the calculated value CV with the pre-stored value PV. In this way two dedicated processors are used for executing different operations, so that each operation may be performed more efficiently and faster. Further to that, the second processing unit 35 may include a special type of processing unit known in the art as a HSM (Hardware Security Module). The secure memory unit 20 and the pre-stored value PV stored therein may be part of the HSM in the second processing unit 35. It should be noted that Alternatively the HSM may have secure access to the pre-stored value PV in the secure memory unit 20 by means of a bus connecting the secure memory unit 20 with the HSM in the second processing unit 35 (shown in FIG. 1b with a double arrow from the secure memory unit 20 to the second processing unit 35). The HSM in the second processing unit 35 may be a physical plug-in card device or an external security device that may be attached to the memory controller 10. The HSM may usually include one or more processors dedicated for carrying out secure cryptographic operations with which data is protected against tampering and bus probing. Therefore the pre-stored value PV may be stored, generated, and encrypted in the HSM as cryptographic keys. By using a HSM in the second processing unit 35, security of the memory controller 10 and of the start-up of the memory controller 10 and the first memory unit 15 is further improved. In fact starting-up the memory controller 10 including the first memory unit 15 represents a critical phase for the security of the memory controller 10. This is in fact the phase in which data DATA in the first memory unit 15 may be more easily accessed or tampered. In this phase software programs that may be stored in the first memory unit 15 may be more easily updated, thus also more easily manipulated by non-authorized persons.

Figure 2A:
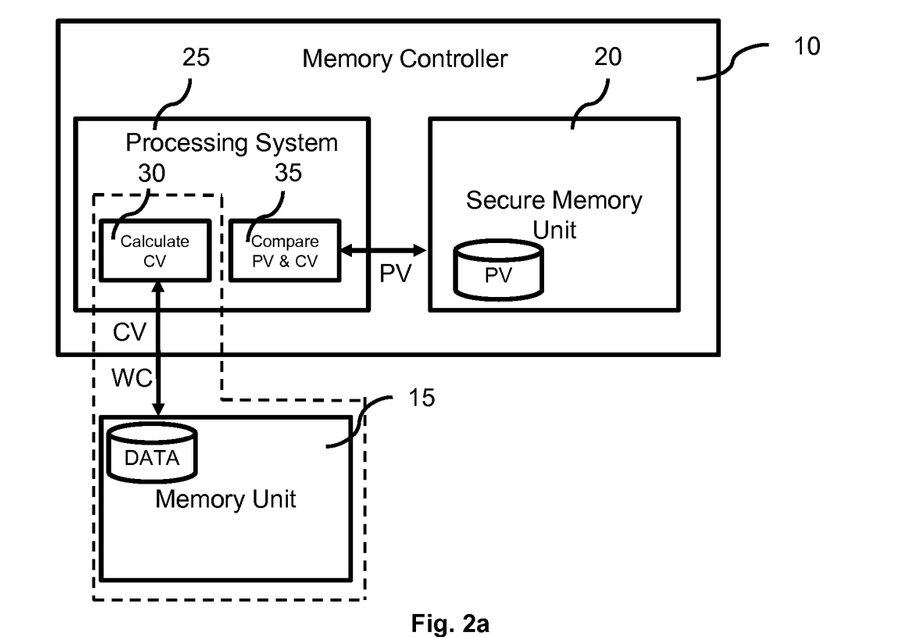
FIG. 2a schematically shows a further example of an embodiment of a memory controller.

In another exemplary embodiment shown in FIG. 2a, the first processing unit 30 is integrated with the first memory unit 15 and the first processing unit 30 may read and write data DATA from and to the first memory unit 15 on a block-wise basis. For example the first processing unit 30 may be embedded in a same chip or same package with the first memory unit 15. This allows a close physical connection between the processing unit 30 and the first memory unit 15. In this way the first processing unit 30 may read and write data DATA from and to the first memory unit 15 with increased speed. In case that the first memory unit 15 is a flash memory with a large basic block for erasing and programming, the speed with which the first processing unit 30 may read and write data DATA from and to the first memory unit 15 may be further increased. In fact as larger is the basic block for erasing and programming of the flash memory in the first memory unit 15, the more is the speed with which the processing unit reads and writes the data DATA and calculates the calculated value CV increased. The flash memory in the first memory unit 15 may be for example structured in a array blocks and each one of the array block may have a size of 128 or 256 bits. In this way the first processing unit 30 may read and write data DATA with the size of 128 or 256 bits at once. In this case the first processing unit 30 may calculate the calculated value CV (which e.g. may be the HASH calculated value cited in the above mentioned example) per each array block with the size of 128 or 256 bits at once. As a consequence the exemplary embodiment of FIG. 2a has a further advantage of having a faster interface connection between the first memory unit 15 and the processing unit 30. When the first memory unit 15 is embedded with the processing unit 30 in the same chip in a way that the processing unit 30 may read and write data DATA on a block-basis, starting-up of the first memory unit 15 with the embedded processing unit 30 will be also faster.

Figure 2B:
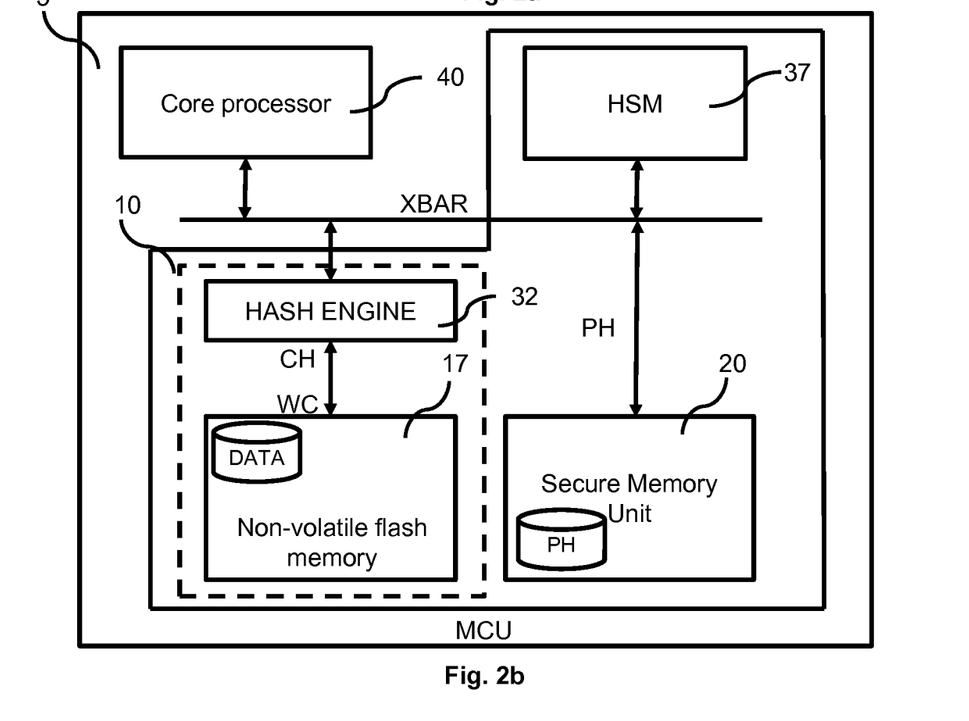

FIG. 2b shows an exemplary embodiment of a MCU 5 that includes the memory controller 10 described in FIG. 2a. In this exemplary embodiment the first memory unit 15 described in FIG. 2a is a non-volatile flash memory 17, the first processing unit 30 described in FIG. 2a is an HASH engine 32 used to calculate the calculated HASH value CH representative for the data DATA in the non-volatile flash memory 17 after the write cycle WC and the second processing unit 35 is an HSM 37 (Hardware Security Module) used to compare the calculate HASH value CH with the pre-stored HASH value PH stored in the secure memory unit 20. The MCU 5 further includes a core processor 40. The core processor 40 gives instructions to the non-volatile flash memory 17 and the memory controller 10 to write data DATA to the non-volatile flash memory 17. The core processor 40 may communicate with the memory controller 10 by means of a crossbar switch XBAR. Alternatively the core processor 40 may communicate with the memory controller 10 by means of any suitable type of system bus. The HSM 37 may communicate within the memory controller by means of the same crossbar switch XBAR or the suitable type of system bus. The crossbar switch XBAR is a switch connecting multiple inputs to multiple outputs in a matrix manner. The crossbar switch XBAR may act as a main system bus typically used in a microcontroller architecture as the one shown in FIG. 2b. In this architecture of the MCU 5, the core processor 40 and the HSM 37 may be on one side of the crossbar switch XBAR, which is a master or initiator side, and the non-volatile flash memory 17 with the HASH engine 32 and the secure memory unit 20 may be on another side of the crossbar switch XBAR, which is a slave or receiver side. The crossbar switch XBAR is typically slower than a bus connecting for example the non-volatile flash memory 17 with the HASH engine 32. The secure memory unit 20 may be embedded in other parts of the memory controller 10. The secure memory unit 20 may be embedded for example in the HSM 37. In any cases the HSM 37 has secure access to the secure memory unit 20 in order to retrieve the pre-stored HASH value PH from the secure memory unit 20. It should be noted that the pre-stored HASH value PH may be pre-stored in the secure memory unit 20 in a production phase of the MCU 5. In this case security of the MCU 5 may be ensured by the fact that the pre-stored HASH value PH is known by the producer of the MCU 5 who is the only authorized person to know and modify the pre-stored HASH value. Alternatively the secure memory unit 20 may be modified by an authorized person after the production phase of the MCU 5. In this last case a user of the MCU 5 or the user of the MCU 5 together with the producer of the MCU 5 are the only authorized persons to know the pre-stored HASH value PH and to know how to modify the pre-stored HASH value. After that the core processor 40 gives instructions to the memory controller 10 to initiate the write cycle WC, the non-volatile flash memory 17 may be written and a correspondent calculation of the calculated HASH value CH may be executed by the HASH engine 32. The calculated HASH value CH is offered as a read-only value to the HSM 37. The read-only value of the calculated HASH value CH may be made available to the HSM 37 via a register interface implemented in an integrated part of the memory controller 10 indicated in FIG. 2b with a dashed line embedding the non-volatile flash memory 17 with the HASH engine 32. The HSM 37 may be a master having a unique identification code. The master HSM 37 may send a reading request to read the pre-stored HASH value PH through the crossbar switch XBAR or the suitable type of system bus to the slave or receiver side. The reading request may include the unique identification code. The secure memory unit 20 which may be at the slave or receiver side of the MGUS, may receive the reading request to read the pre-stored HASH value PH sent by the master HSM 37. The secure memory unit 20 may be configured to decode the unique identification code included in the reading request and to grant access to the pre-stored HASH value if the uncoded unique identification code is correct. Alternatively the HSM 37 may be directly and uniquely connected to the secure memory unit 20 to have secure access to the pre-stored HASH value PH. After retrieving the calculated HASH value CH from the non-volatile flash memory 17 or the HASH engine 32 and the pre-stored HASH value PH from the secure memory unit 20, the HSM 37 compares the calculated HASH value CH with the pre-stored HASH value PH. The HSM 37 may start a comparison of the calculated HASH value CH with the pre-stored HASH value PH during a start-up of the MCU 5. In this case the comparison may be executed autonomously in parallel to a reset sequence of the MCU 5. If the calculated HASH value CH does not match with the pre-stored HASH value PH the MCU 5 may stop functioning (e.g. the MCU 5 may reset). Alternatively some features of the MCU 5 may be disabled. The MCU 5 may for example work with a slower clock or produce a large jitter on the crossbar switch XBAR or the suitable type of system bus to prevent any communication. Alternatively the HSM 37 may stop providing any secure cryptographic operations such that any security request coming externally to the MCU 5 may not be answered because the HSM 37 may not be able to decode the incoming security request.

In standard microcontrollers, the calculation of the calculated HASH value CH is performed by the core processor 40. In this case the data DATA from the non-volatile flash memory 17 needs to be read by the core processor 40 by means of the crossbar switch XBAR. As a consequence the core processor 40 is loaded with the calculation of the calculated HASH value CH and the crossbar switch is loaded with a transfer of the data DATA coming from the non-volatile flash memory 17.

The MCU 5 shown in FIG. 2*a* has thus several advantages over standard microcontrollers. The calculation of the calculated HASH value CH is performed locally in a non-volatile flash memory 17 which embeds a HASH engine 32. Consequently the calculation of the calculated HASH value CH may be faster because a faster connection than the crossbar switch XBAR is implemented between the non-volatile flash memory 17 and the HASH engine 32. The faster connection is capable of reading and writing data DATA on block-wise basis from and to the non-volatile flash memory 17. Further to that the core processor 40 is not loaded with the calculation, and the crossbar switch XBAR is not loaded with the data DATA transfer. These advantages translate into a MCU 5 which is overall more efficient than standard microcontrollers.

In addition to that, in standard microcontrollers the calculation of the calculated HASH value CH as well as the comparison of the calculated HASH value CH with the pre-stored HASH value PH is performed during a start-up of the microcontrollers, slowing down the start-up. In the MCU 5 of FIG. 2*b* only the comparison between the calculated HASH value CH and the pre-stored HASH value PH may be performed at the start-up of the MCU 5 because the calculation of the calculated HASH value CH is performed in an earlier phase after the write cycle WC. As a consequence a faster start-up of the MCU 5 may be obtained. For example in standard microcontrollers with a non-volatile flash memory of 3 MByte, verification of authenticity of the data takes about 100-150 ms. By implementing the solution described in FIG. 2*b*, one comparison of the calculated HASH value CH with the pre-stored HASH value PH with a 120 MHz core processor 40 may take less than 100 ns. Typically the memory controller 10 starts up from a reset earlier than the core processor 40. One additional advantage of the solution described in FIG. 2*b* is that the comparison of the calculated HASH value CH with the pre-stored HASH value PH may be performed before the core processor 40 starts up from the reset.

In some other examples, the MCU 5 may be part of an automotive vehicle and in particular of a safety system embedded in the automotive vehicle. The safety system may include a plurality of MCU 5. The safety system may be for example a break system. The break system may receive a break command from a central node which may be another MCU 5. The break command may be potentially accessed by unauthorized persons and an illegal break command may be send to the break system. This may especially happen in those automotive vehicles that may be connected to new infotainment systems which may be connected to for example smartphones. By using the HSM 37 in the MCU 5 and the cryptographic algorithms implemented in the HSM 37 the break command may be protected against access by unauthorized persons. The safety system may also be an immobilizer or a component protection system. The immobilizer or the component protection system may protect the automotive vehicle from being stolen or disassembled in such a way that the MCU 5 or the plurality of MCU 5 may be re-sold in an after-market. All mentioned safety systems may require a MCU 5 as described in FIG. 2*b* such that a safety level of the automotive vehicle may be improved and a verification time of the non-volatile flash memory 17 in each of the MCU 5 may be reduced.

Figure 3:
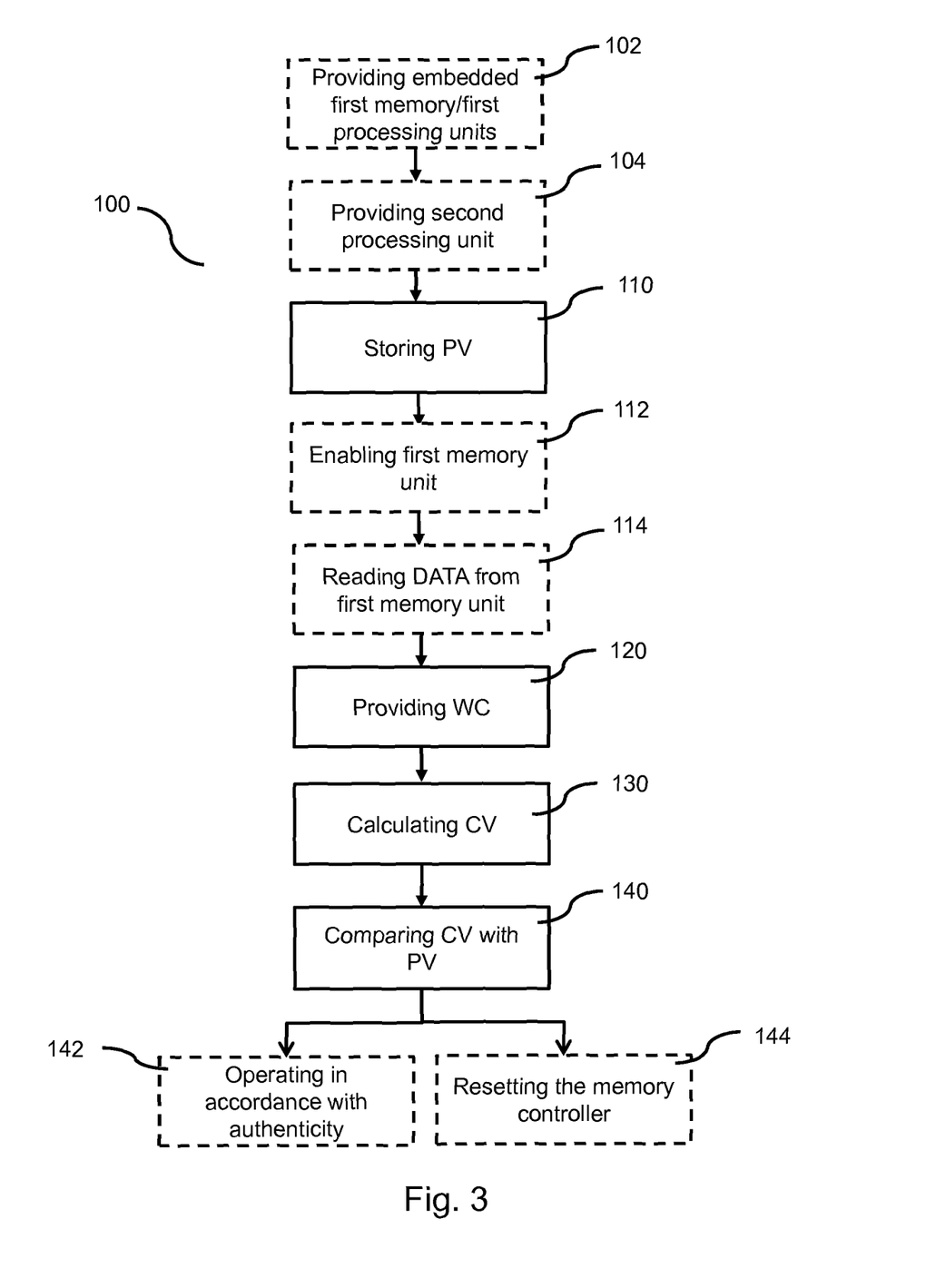
FIG. 3 schematically shows a flow diagram of a method for verifying authenticity of data stored in a non-volatile flash memory.

FIG. 3 schematically shows a flow diagram of a method 100 for verifying authenticity of data stored in a memory unit. The flow diagram provides the method 100 of controlling the memory controller 10 depicted in FIG. 1*a* to 2*b*. The method 100 comprises storing in a secure memory unit 20 a pre-stored value PV representative of the authenticity of the data DATA to be written in the first memory unit 15, providing 120 a write cycle WC in the first memory unit 15, calculating 130 a calculated value CV in response to the write cycle WC in the first memory unit 15, the calculated value CV being representative of the data DATA in the first memory unit 15 after the write cycle WC, and comparing 140 the calculated value CV with the pre-stored value CV for verifying whether the data DATA stored in the first memory unit 15 after the write cycle WC has been altered in accordance with the authenticity. The method 100 may also execute the comparing 140 during a starting-up of the memory controller 10. The method 100 may optionally comprise before the providing 120 the write cycle WC, enabling 112 the first memory unit 15 to write the data DATA during the write cycle WC, reading 114 data DATA from the first memory unit 15 on block-wise basis. The providing 120 may optionally be also providing a write cycle to the first memory unit 15 on a block-wise basis. The method 100 may also optionally comprise providing 102 a first memory unit 15 embedded with a first processing unit 30 and operating the first processing unit 30 to calculate the calculated value CV (as in the memory controller 10 depicted in FIG. 2*a*). The method 100 may optionally further comprise providing 104 a second processing unit 35 and operating the second processing unit 35 to securely access the pre-stored value PV from the secure memory unit 20 and further operating the second processing unit 35 to compare the calculated value CV with the pre-stored value PV. After the comparing 140 the method 100 may optionally comprise operating 142 the memory controller 10 in accordance with the authenticity of the data DATA if the data DATA in the first memory unit 15 after the write cycle 15 has been altered in accordance with the authenticity, or resetting 144 the memory controller 10 if the data DATA in the first memory unit 15 after the write cycle WC has been altered not in accordance with the authenticity of the data DATA. Again, alternatively, the system feature set may be reduced.

In one embodiment, the memory controller 10 is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device.

Also, devices functionally forming separate devices may be integrated in a single physical device. Also, the units and circuits may be suitably combined in one or more semiconductor devices.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A memory controller for verifying authenticity of data, the memory controller comprising:
   a secure memory unit storing a pre-stored value representative for the authenticity of the data, wherein the data is to be written into a first memory unit and the pre-stored value is calculated based on the data;
   a processing system configured for calculating a calculated value based on contents of the first memory, the processing system being further configured to calculate the calculated value in response to a write cycle in which the data is written to the first memory and to compare the calculated value with the pre-stored value to verify whether the data in the first memory unit after the write cycle has been altered in accordance with the authenticity.

2. The memory controller of claim 1, wherein the secure memory unit is arranged in a secure area of the memory controller.

3. The memory controller of claim 1, wherein the processing system is further configured to compare the calculated value with the pre-stored value during a start-up of the memory controller and the first memory unit.

4. The memory controller of claim 1, wherein the processing system is further configured to stop or to limit a functionality of the memory controller when the data stored in the first memory unit after the write cycle has been altered not in accordance with the authenticity.

5. The memory controller of claim 1, wherein the processing system comprises a first processing unit configured to calculate the calculated value and a second processing unit configured to compare the calculated value with the pre-stored value, and wherein the second processing unit is further configured to securely access the pre-stored value in the secure memory unit.

6. The memory controller of claim 5, wherein: the second processing unit comprises a unique identification code; the second processing unit is further configured to send a reading request to read the pre-stored value to the secure memory unit; the reading request comprises the unique identification code; and the secure memory unit is configured to receive the reading request to read the pre-stored value, to decode the unique identification code and to grant access to the pre-stored value when the decoded unique identification code is correct.

7. The memory controller of claim 5, wherein: the first processing unit is integrated with the first memory unit, and the first processing unit is further configured to read and write the data from the first memory unit on a block-wise basis.

8. The memory controller of claim 1, wherein the first memory unit is a non-volatile flash memory unit.

9. The memory controller of claim 1, wherein the calculated value is stored in a secure area of the memory controller.

10. The memory controller of claim 1, wherein the calculated and pre-stored values are HASH values.

11. The memory controller of claim 5 wherein the first processing unit is a HASH engine and the second processing unit comprises a Hardware Secure Module.

12. A microcontroller unit comprising:
    a memory controller including:
       a secure memory unit storing a pre-stored value representative for the authenticity of the data, wherein the data is to be written into a first memory unit and the pre-stored value is calculated based on the data;
       a processing system configured for calculating a calculated value based on contents of the first memory, the processing system being further configured to calculate the calculated value in response to a write cycle in which the data is written to the first memory and to compare the calculated value with the pre-stored value to verify whether the data in the first memory unit after the write cycle has been altered in accordance with the authenticity; and a core processor configured to provide instructions to the memory controller to initiate the write cycle.

13. The microcontroller unit of claim 12, wherein the core processor is configured for starting-up the microcontroller unit.

14. A method for controlling a first memory unit and for verifying authenticity of data stored in the first memory unit, the method comprising:

storing in a secure memory unit a pre-stored value representative of the authenticity of the data, wherein the data is to be written in the first memory unit and the pre-stored value is calculated based on the data, performing a write cycle during which the data is written in the first memory unit, calculating a calculated value in response to the write cycle of the first memory unit, the calculated value based on the contents of the first memory, and comparing the calculated value with the pre-stored value for verifying whether the data stored in the first memory unit after the write cycle has been altered in accordance with the authenticity.

15. The method of claim 14, the comparing the calculated value with the pre-stored value being performed during a start-up.

* * * * *